United States Patent [19]
De Anfrasio

[11] Patent Number: 5,638,584
[45] Date of Patent: Jun. 17, 1997

[54] ATTACHMENT AND CABLE FASTENING DEVICE

[76] Inventor: Antoine De Anfrasio, 23616 Baltar St., West Hills, Calif. 91304

[21] Appl. No.: 630,021

[22] Filed: Apr. 8, 1996

[51] Int. Cl.⁶ .......................... A44B 21/00; F16G 11/00
[52] U.S. Cl. .................. 24/265 H; 24/300; 24/598.5
[58] Field of Search ................ 24/265 H, 598.5, 24/905, 300, 370, 715.3, 482, 712, 129 D, 714.3, 714.6, 715.2

[56] References Cited

U.S. PATENT DOCUMENTS

| | | | |
|---|---|---|---|
| 1,098,426 | 6/1914 | Cochrane | 24/129 D |
| 2,036,482 | 4/1936 | Larson | 24/715.3 |
| 2,146,190 | 2/1939 | Luke | 24/482 |
| 2,308,286 | 1/1943 | Joyce | 24/129 D |
| 2,674,824 | 4/1954 | Werner | 24/129 D |
| 2,889,165 | 6/1959 | Bientara | 24/300 |
| 3,126,228 | 3/1964 | Greene et al. | 24/598.5 |
| 3,748,703 | 7/1973 | Maillocheau | 24/265 H |
| 5,317,788 | 6/1994 | Esposito et al. | 24/300 |
| 5,351,367 | 10/1994 | Kennedy et al. | 24/300 |

*Primary Examiner*—Victor N. Sakran
*Attorney, Agent, or Firm*—Daniel R. Kimbell

[57] ABSTRACT

An attachment and cable fastening device. The device has an elongate elastic cable folded over at least one of its ends to form an eyelet. An metallic ring is crimped around the elastic cable's folded over ends. A strong metal hook with a frontwardly lying generally U-shaped front hook portion and a bent end extremity is placed with its bent end extremity fitted into the eyelet. A plastic covering is formed around the folded over end of said elastic cable, the metallic ring and the strong metal hook.

18 Claims, 2 Drawing Sheets

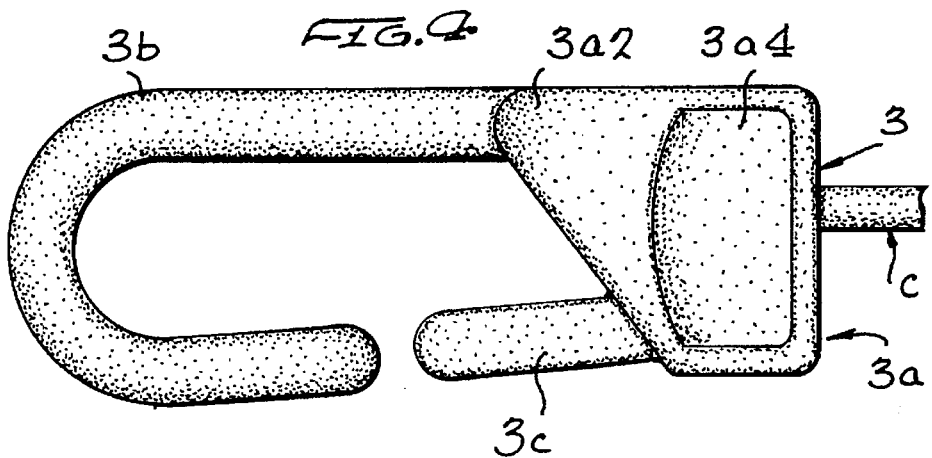
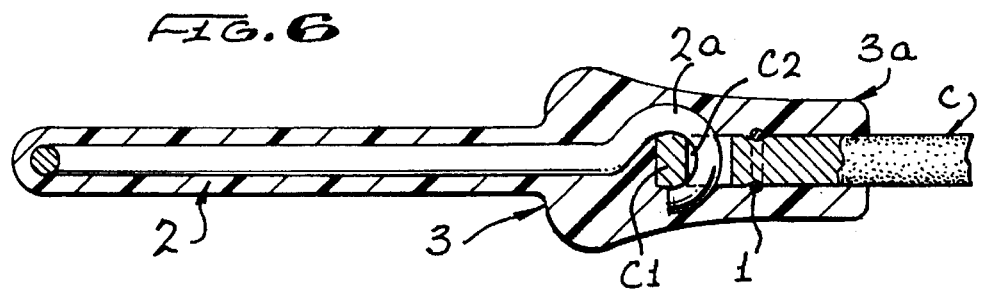
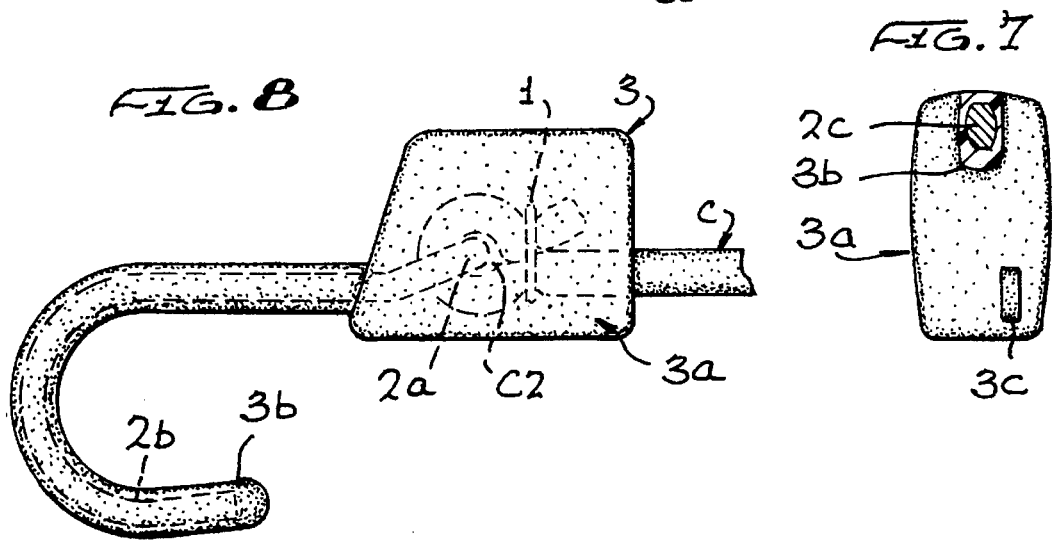
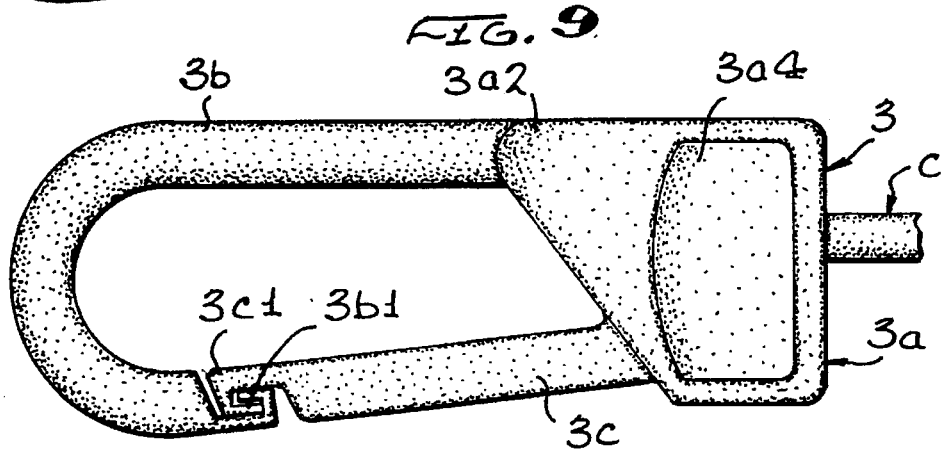

ATTACHMENT AND CABLE FASTENING DEVICE

BACKGROUND OF THE INVENTION

The invention concerns particularly the technical industry for attachment and fastening devices similar to the type used for luggage elastic, rubber shock absorbers, chest expanders . . . (sometimes hereinafter referred to as elastic cord.

There are different versions of elastic shock cords and similar devices for attachment, fastening, or hanging from an elastic cable that has at least one extremity connected to an instrument type hook.

An example is the elastic shock cord in which the cable extremities are simply equipped with a ring that has been crimped, whose extremities are thereafter lodged into the shaft of the hook.

Under another version, the hook-end extremity forms a ring crimped on the extremity of the cable, which all together can ultimately be covered with a suitable plastic material.

While these types of popular elastic cords are often times satisfactory, they nonetheless do not exhibit a considerable resistance to traction. Indeed, when there is more than 66–132 pounds (30 to 60 kilograms) of traction, either the hook opens because it is made of ordinary steel, or the connector cable-ring or cable-hook breaks.

In order to improve the quality of these elastic cords, I thought about placing a buckle at the extremities of the cable, and crimping the ring or the hook-end extremity behind this buckle. In this manner, the increased traction strength, if substantial, would be enough to specifically comply with the new security standards, for example in the areas of methods of holding cart merchandise or maintenance garage rack tools.

The attachment and fastening device, under the invention, is in accordance with these criteria in that it allows for traction effort in excess of 220 pounds (100 kilograms) in a cable composition that is similar to its predecessors.

One way to achieve these ends is that the attachment and fastening device includes a combination of a buckle on the cable extremity crimped with a metallic ring, a sturdy solid metallic hook fastened on the end to work with the buckle on the cable, and a covering of the entire crimped buckle and hook with a plastic material made of good mechanical elements.

Another way to increase the device's traction resistance is that the metallic hook is made of steel made of good mechanical elements that can undergo an appropriate surface treatment, or the hook can also be made with a flat plane or ovoid section, or the plastic covering material can even be of a reinforced resin.

Under the invention, we also tried to get a good handle on the attachment and fastening device, without the risk of fingers slipping under the traction strain. Therefore, the entire device is covered with and composed of ergonomical properties, and in particular by an enlargement where the hook begins which continues along its two large sides.

Those characteristics and others will emerge in the following description.

BRIEF DESCRIPTION OF THE DRAWINGS

To determine the purpose of the invention without thereby limiting it, in the pictures attached:

FIG. 4 an exterior view similar to FIG. 3.

FIG. 6 is a cut longitudinal view following lines 6 to 6 of FIG. 3.

FIG. 7 is a cut transversal view following lines 7 to 7 of FIG. 3.

FIG. 8 illustrates a variation model of the device according to the invention, in particular the molded hook.

FIG. 9 illustrates another variation model in which the security attachment works with the free end extremity of the hook.

DETAILED DESCRIPTION OF THE INVENTION

Figure 1:
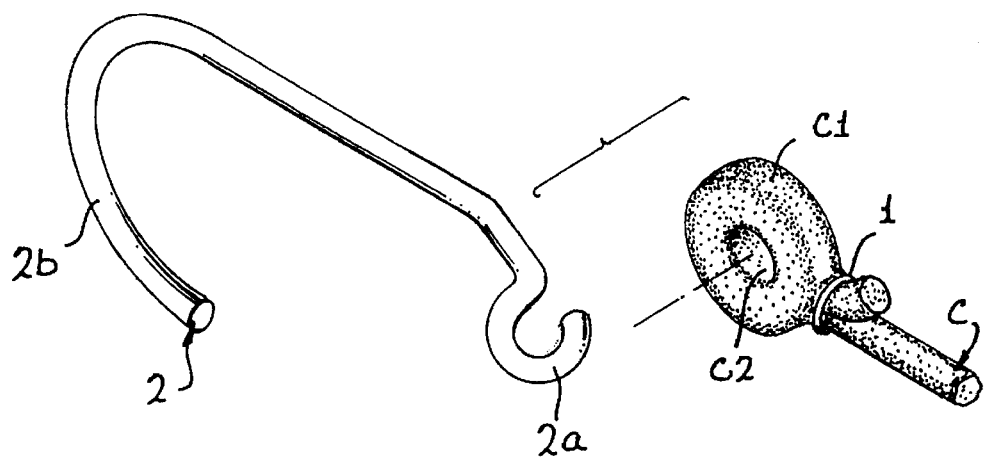
FIG. 1 is a perspective view which separately illustrates the end buckle of the cable and the metallic hook of the invention.

In order to give more concrete details about the invention's purpose, we now describe it in a manner not limited to what is illustrated in the drawings.

The principal goal is to put together an assembly that is very resilient to traction; the tests showed that in order to obtain worthwhile results, we need to combine several solutions that we describe hereinafter below:

First of all, at the extremity or at both extremities of a cable (C), preferably but not necessarily composed of several elastomer blended fibers coated with a textile girdle, of the type named sandow elastic cord, a buckle (C1) is created that is crimped with a surrounding metallic ring (1) by crushing the two fibers of the cable behind the buckle (FIG. 1).

Figure 2:
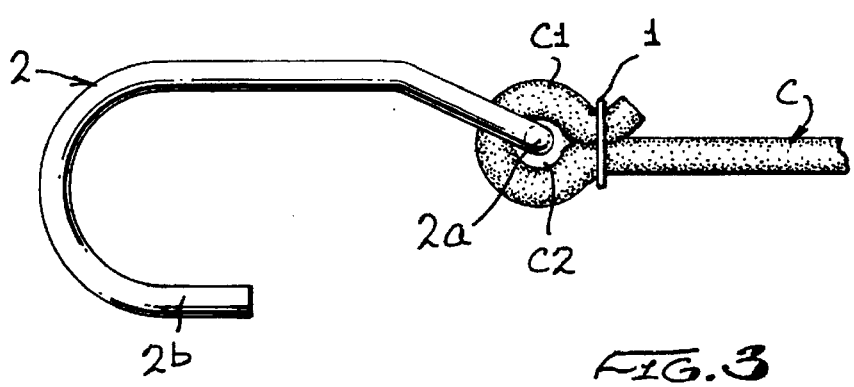
FIG. 2 is a side view showing the end buckle of the cable assembled to the metallic hook.

In the eyelet (C2) of the buckle is the bended end extremity (2a) of a hook (2) in metallic fiber (FIG. 2), then the entire buckle (C1)—hook (2) is covered with a plastic material (3).

Figure 3:
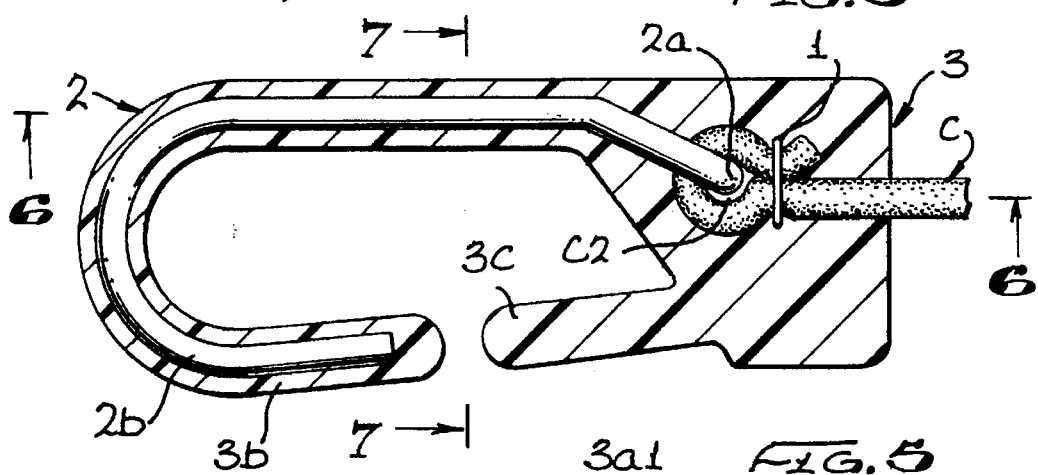
FIG. 3 is a cut view illustrating the covering of the entire end metallic buckle-hook.

As we can see in FIG. 3, the very close connection between the plastic coating material, the independent hook and the crimped buckle of the cable helps in large part to improve the traction resistance as compared to the classic assemblies mentioned above.

In order to increase more the traction resistance, we also forsee the creation of the hook (2) made of good steel mechanical elements with eventually a surface quenching treatment followed by a tempering, thereby avoiding the opening of the active part (2b) of the hook due to heavy exertion. We can also create the hook with a flat plane (2c) or ovoid section as shown in FIG. 7.

The covering (3) constituting a molding, can also be accomplished with resin which increases even more the traction resistance.

This covering extends across a part of the massive rear (3a) surrounding mostly the curved end (2a) of the hook, the buckle (C1) and the crimping ring (1), then a part (3b) in a hook shape surrounding the hook (2) and its counter part (2b) and, eventually a flexible security attachment (3c) coming from the massive rear (3a), opposite the hook start (3b) and spreading out in alignment with the free extremity of the active part of the hook, leaving between them a space for passing of the element onto which must attach the invention device.

Figure 5:
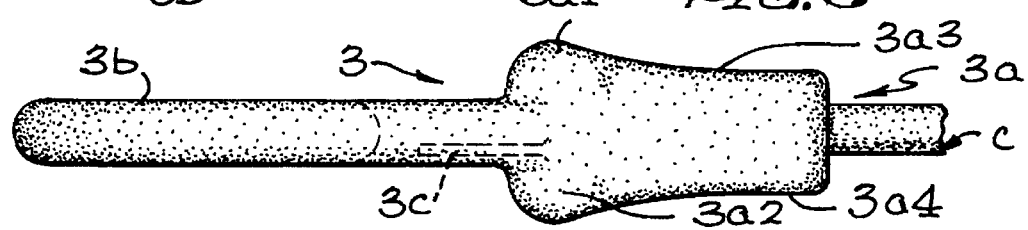
FIG. 5 is a blueprint view corresponding to FIG. 4.

To avoid any unreasonable slipping of the user's fingers under the traction strain, I also foresaw to create the massive part (3a) of the covering into an ergonomic shape, specifically, as we can see on FIGS. 4, 5 and 6, with some lateral bulge (3a1–3a2) at the hook's start level and following at least its two big sides. These bulges constitute natural abutments for the thumb and index finger which become lodged into the cavities or depressions (3a3–3a4) thereby formed at the rear of the bulges.

For certain uses, it is necessary to arrange the massive part (3a) of the covering in support of or very close to a surface and to anchor the hook below the said surface.

In order to do this, I foresaw as illustrated on FIG. 8 to reverse the direction of the active part of the hook (2b–3b), which is thus moved forward as compared to the massive part (3a), instead of being in its prolongation.

In another variation illustrated on FIG. 9, the security attachment (3c) coming from the molding is relatively rigid and introduces at its free extremity a hook shape (3c.1) to blend with the free extremity of the molded hook (3b) thereby creating an additional hooker. (3b.1).

The advantages are seen from the description. I underline once again that there has been a very significant increase of traction resistance due to the combination of the links between the cable and hook, and to the materials utilized, as well as the good control of the attachment devices with ergonomical forms that were judiciously conceived.

I claim:

1. An attachment and cable fastening device, comprising:

an elongate elastic cable with a plurality of ends;

a plurality of strong metal hooks, each having a forwardly lying front hook portion, one each of said strong metal hooks being attached to each said end of said elongate elastic cable by a crimping ring; and a plastic covering permanently enveloping said ends of said elastic cable, said crimping ring and said strong metal hooks.

2. The attachment and cable fastening device of claim 1, wherein said crimping rings are metallic and said strong metal hooks have a rearwardly lying curved back portion, said ends of said elongate elastic cable are bent over and said crimping rings are crimped therearound to form an eyelet, and a curved back part of said metal hooks are inserted into said eyelet.

3. The attachment and cable fastening device of claim 1, wherein said metal hooks are steel that have been coated with a surface treatment to increase their traction.

4. The attachment and cable fastening device of claim 1, wherein said metal hooks are formed of generally flattened material.

5. The attachment and cable fastening device of claim 1, wherein said metal hooks are formed of steel wire which has a generally ovoid cross-section.

6. The attachment and cable fastening device of claim 1, wherein said plastic covering contains an enlarged portion in a vicinity of said crimping rings having lateral bulges at a frontmost portion thereof, and a cavity to accommodate a thumb and index finger of a user of the device.

7. The attachment and cable fastening device of claim 1, wherein said forwardly lying front hook portions extends frontwardly from a first side region of said plastic covering and around and back to, but not contacting a second side region of said plastic covering to define a hooking capture region.

8. The attachment and cable fastening device of claim 7, wherein said plastic covering further comprises a flexible finger portion which extends forwardly from said second side region of said plastic covering to be adjacent to said front hook portion.

9. The attachment and cable fastening device of claim 8, wherein said flexible finger portion is adapted to lockably engage with a portion of said front hook portion.

10. The attachment and cable fastening device of claim 9, wherein said plastic covering contains an enlarged portion in a vicinity of said crimping ring having lateral bulges at a frontmost portion thereof, and a cavity to accommodate a thumb and index finger of a user of the device.

11. An attachment and cable fastening device, comprising:

an elongate elastic cable folded over at least one of its ends to form an eyelet;

a metallic ring crimped around the elastic cable's folded over ends to maintain said eyelet;

a strong-metal hook with a frontwardly lying generally U-shaped front hook portion and a bent end extremity, said bend end extremity being adapted to be fitted into said eyelet; and a plastic covering formed around and permanently enveloping said folded over end of said elastic cable, said metallic ring and said strong metal hook.

12. The attachment and cable fastening device of claim 11, wherein said metal hooks are steel that has been coated with a surface treatment to increase its traction.

13. The attachment and cable fastening device of claim 11, wherein said metal hooks are formed of generally flattened material.

14. The attachment and cable fastening device of claim 11, wherein said metal hooks are formed of steel wire which has a generally ovoid cross-section.

15. The attachment and cable fastening device of claim 11, wherein said forwardly lying front hook portion extends frontwardly from a first side region of said plastic covering and around and back to, but not contacting a second side region of said plastic covering to define a hooking capture region.

16. The attachment and cable fastening device of claim 15, wherein said plastic covering further comprises a flexible finger portion which extends forwardly from said second side region of said plastic covering to be adjacent to said front hook portion.

17. The attachment and cable fastening device of claim 16, wherein said flexible finger portion is adapted to lockably engage with a portion of said front hook portion.

18. The attachment and cable fastening device of claim 11, wherein said elongate elastic cable is folded over at its two ends, and two metallic rings are fit thereon.

* * * * *

UNITED STATES PATENT AND TRADEMARK OFFICE
CERTIFICATE OF CORRECTION

PATENT NO. : 5,638,584
DATED : June 17, 1997
INVENTOR(S) : Antoine De Anfrasio

It is certified that error appears in the above-identified patent and that said Letters Patent is hereby corrected as shown below:

On the title page, insert —[30] Foreign Application Priority Data:   Apr. 13, 1995 [FR] France......95 04697—

Signed and Sealed this

Second Day of December, 1997

Attest:

BRUCE LEHMAN

Attesting Officer

Commissioner of Patents and Trademarks